(No Model.)　　　　　J. A. COOPER.　　　4 Sheets—Sheet 1.
POTATO PLANTER.
No. 605,396.　　　　　　　Patented June 7, 1898.

WITNESSES:　　　　　　　　　　　　　　INVENTOR
　　　　　　　　　　　　　　　　　　　　J. A. Cooper
　　　　　　　　　　　　　　　　　　BY
　　　　　　　　　　　　　　　　　　　　ATTORNEYS.

(No Model.) 4 Sheets—Sheet 2.

J. A. COOPER.
POTATO PLANTER.

No. 605,396. Patented June 7, 1898.

WITNESSES:

INVENTOR
J. A. Cooper
BY
ATTORNEYS.

(No Model.)   J. A. COOPER.   4 Sheets—Sheet 3.
POTATO PLANTER.
No. 605,396.   Patented June 7, 1898.
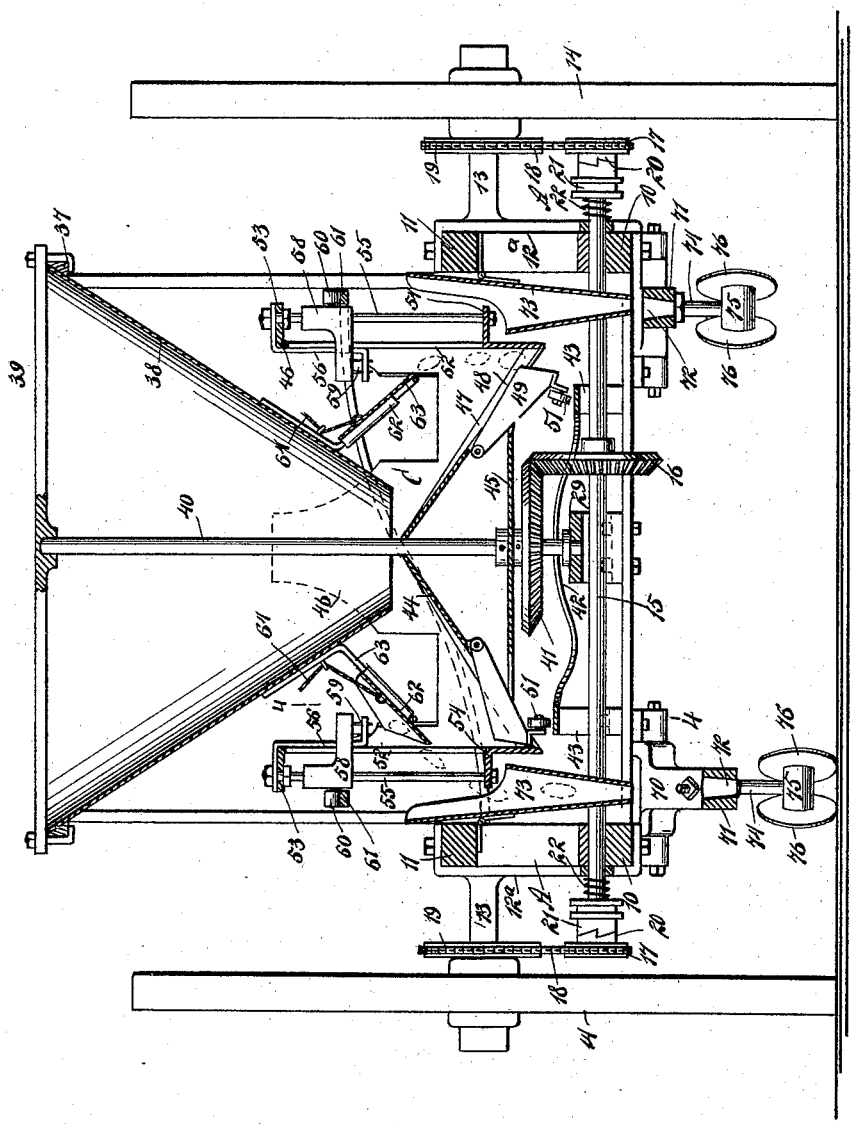
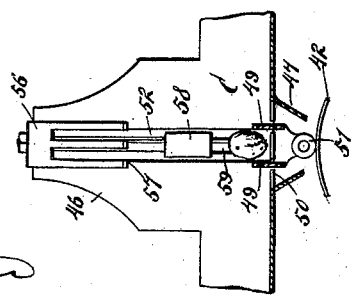
WITNESSES:
INVENTOR
J. A. Cooper
BY
ATTORNEYS.

(No Model.) 4 Sheets—Sheet 4.
J. A. COOPER.
POTATO PLANTER.
No. 605,396. Patented June 7, 1898.
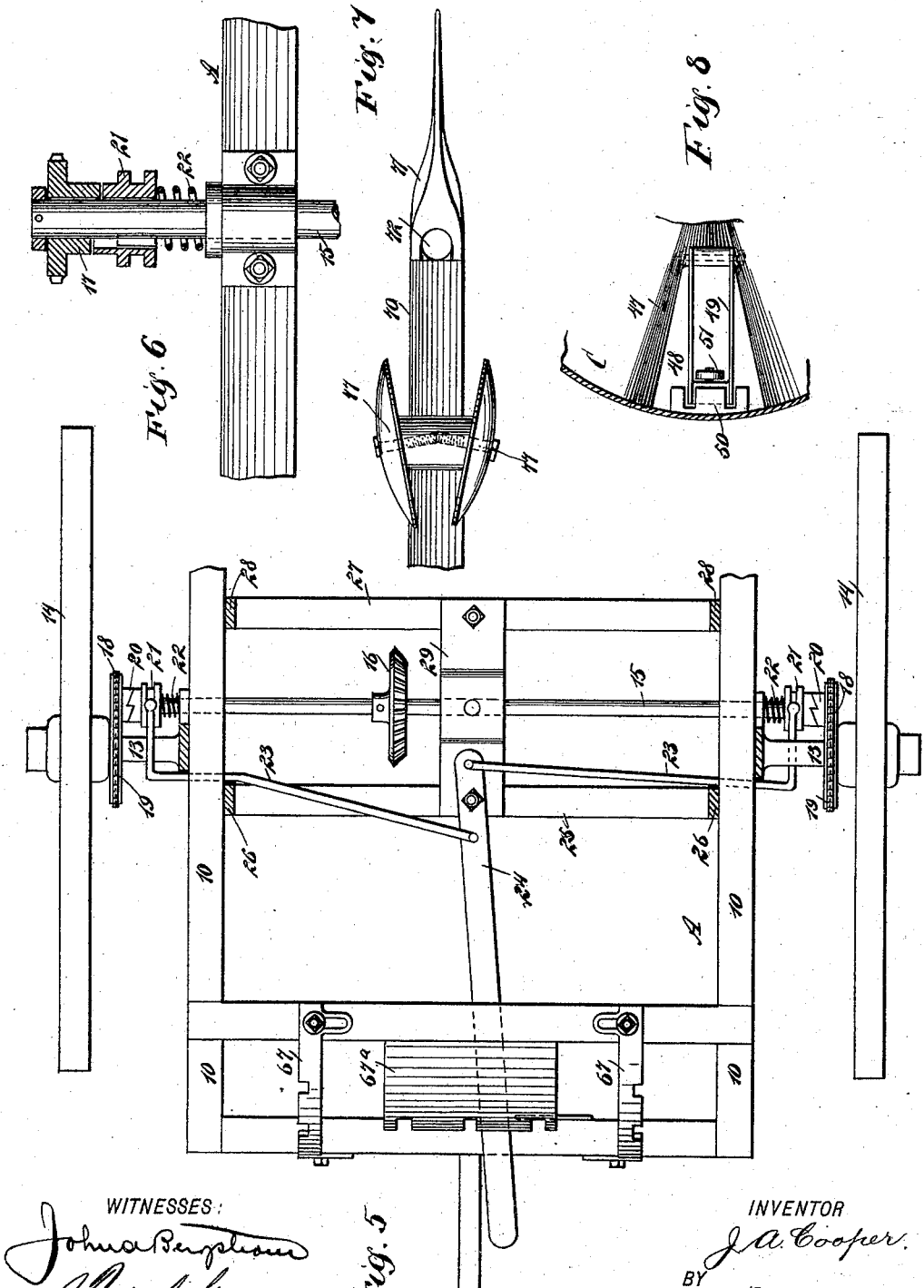
WITNESSES:
INVENTOR
J. A. Cooper.
BY
ATTORNEYS.

UNITED STATES PATENT OFFICE.

JOHN ALEXANDER COOPER, OF SUMMIT, IOWA, ASSIGNOR OF ONE-HALF TO ARTHUR C. SAVAGE, OF ADAIR, IOWA.

POTATO-PLANTER.

SPECIFICATION forming part of Letters Patent No. 605,396, dated June 7, 1898.

Application filed August 3, 1897. Serial No. 646,878. (No model.)

*To all whom it may concern:*

Be it known that I, JOHN ALEXANDER COOPER, of Summit township, in the county of Adair and State of Iowa, have invented a new and Improved Potato-Planter, of which the following is a full, clear, and exact description.

The object of my invention is to provide a simple construction of potato-planter which may be utilized for simultaneously planting two rows, but which may be expeditiously and conveniently arranged to plant but a single row.

Another object of the invention is to provide a planting attachment for a double-row planter from which there will be no side draft when the machine is used for planting a single row, it being possible under the same conditions to plant a single row either at the right or at the left hand portion of the planter, as may be required.

Another object of the invention is to provide a positively-acting gathering device for the seed and a means whereby the seed will be delivered automatically to the hills or the furrows in which the seed is to be planted.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
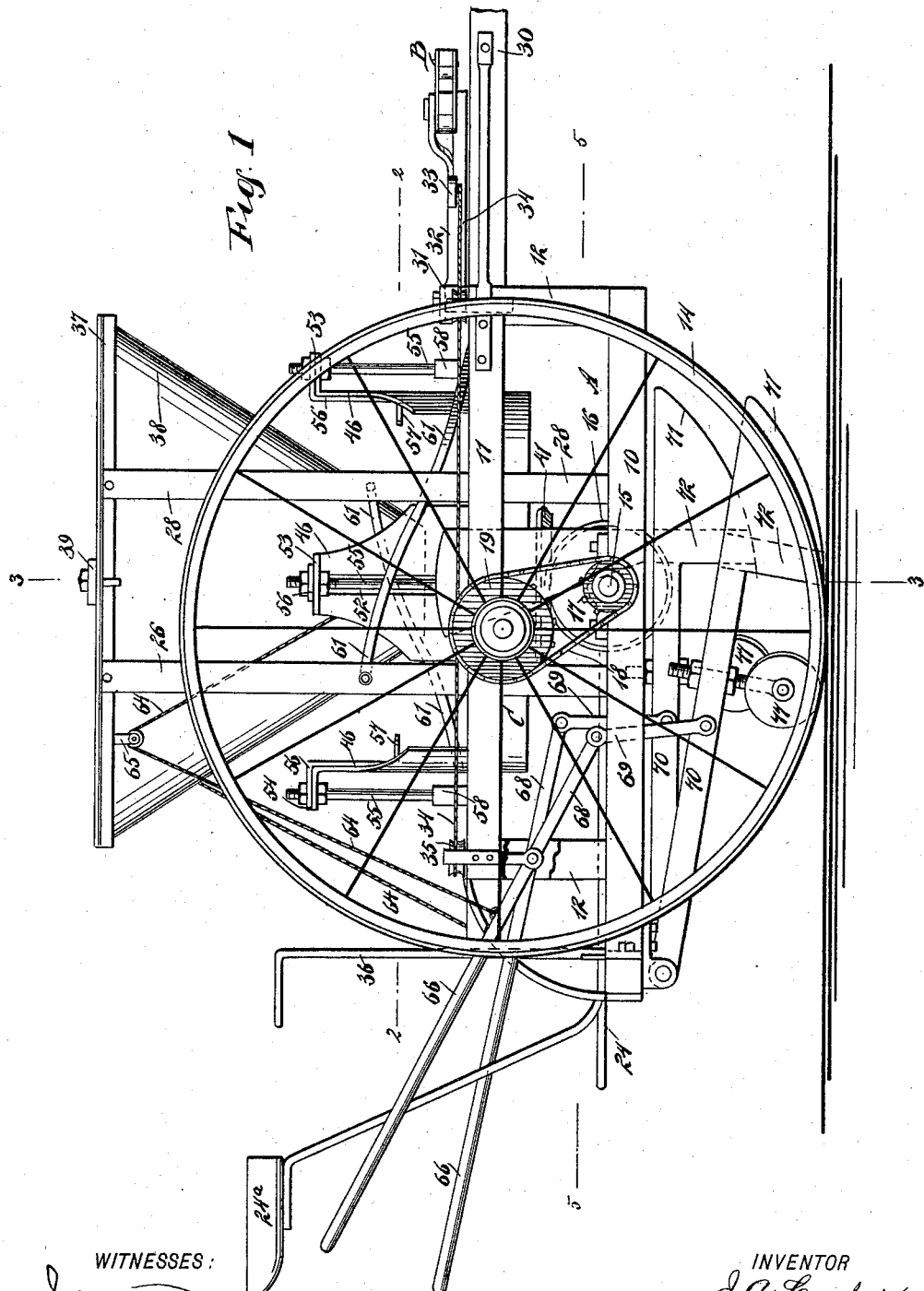
Figure 2:
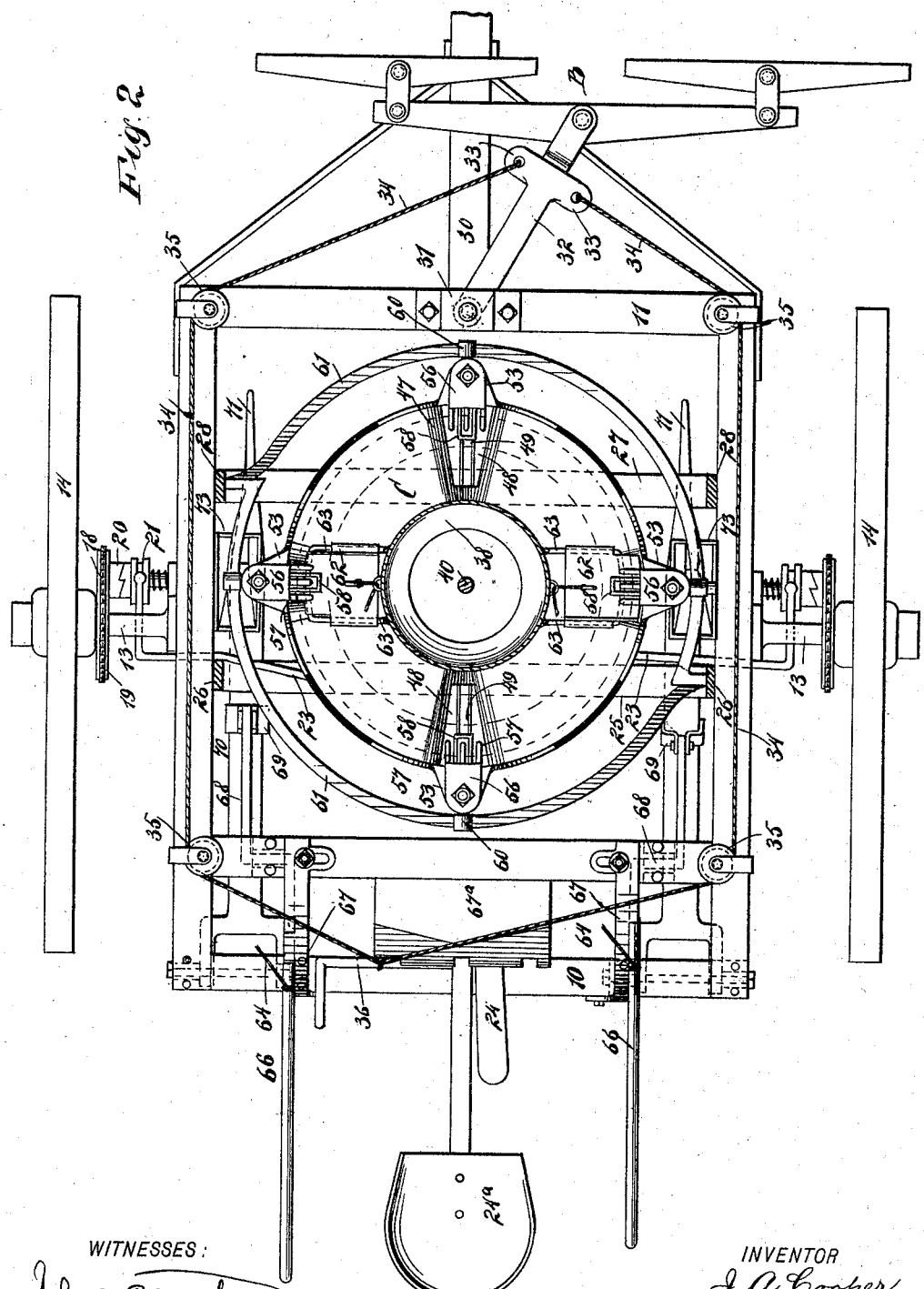

Figure 1 is a side elevation of the improved machine. Fig. 2 is a horizontal section on the line 2 2 of Fig. 1. Fig. 3 is a central vertical section on the line 3 3 of Fig. 1. Fig. 4 is a detail section on the line 4 4 of Fig. 3, illustrating particularly the gathering device for the seed. Fig. 5 is a horizontal section taken practically on the line 5 5 of Fig. 1, showing the frame of the machine in plan view, together with the shifting device for the ground-wheels, a small portion only of the frame being in section. Fig. 6 is an enlarged detail view of one of the shifting devices whereby the action of the ground-wheel may be communicated to the operative parts of the machine or whereby such communication may be stopped, said view being partially a sectional view. Fig. 7 is a bottom plan view of one of the runners and the covering device carried by the runner, and Fig. 8 is a detail plan view of one of the feed devices for one of the gatherers for the seed.

In the drawings I have illustrated the planter as being arranged to plant but one row, the planting mechanism at the opposite side being out of operation, and this arrangement of the parts is particularly shown in Fig. 3. The body-frame of the machine may be of any desired construction. As shown, it comprises a lower skeleton frame 10 and an upper skeleton frame 11, the lower one extending beyond the rear of the upper one, the two frames being connected by uprights 12. The body-frame is likewise shown as of rectangular formation.

At or near the center of the side portions of the frame the upper and lower sections are connected by a metal bar 12$^a$, distinctly shown in Fig. 3, and from the upper portion of each of these bars a stud-axle 13 is horizontally projected, while upon each of said axles a ground-wheel 14 is loosely mounted. In the lower section of the frame a shaft 15 is journaled, extending through from side to side and beyond the sides. This shaft carries between its ends a gear 16, usually a beveled gear, and is provided at each of its extremities with a sprocket-wheel 17, the sprocket-wheels being connected by belts 18 with larger sprocket-wheels 19, attached to the hubs of the ground-wheels.

Each of the smaller sprocket-wheels 17 is provided with an inner clutch-face 20, arranged for engagement with a clutch 21. These clutches have sliding movement on the shaft 15 and turn therewith and are held normally in engagement with the clutch-faces of the sprocket-wheels by means of springs 22, as shown in Figs. 3 and 6.

Each clutch 21 is engaged by a fork formed on the outer end of a link 23. Two of these links 23 are employed, as shown in Fig. 5, being adapted to carry the clutches into or out of engagement with the clutch-faces of the sprocket-wheels 17. The inner ends of the shifting links 23 are pivotally attached to a shifting lever 24, the links being located one at each side of the pivot-point of the said shifting lever, as is likewise shown in Fig. 5. The shifting lever extends out at the back of the machine within convenient reach of the foot of the operator when in the driver's seat 24ª, the seat being supported from the rear of the main frame.

The side bars of the lower section 10 of the frame are connected at the rear of the shaft 15 by a lower connecting-bar 25, forming portions of uprights 26, while in front of said shaft 15 the side bars of the same portion of the frame are connected by a lower bar 27, forming portions of uprights 28, the two cross-bars 25 and 27 being in their turn connected usually at the center by a strap-bar 29, arched over the shaft or axle 15.

The tongue or pole 30 is secured to the upper section of the frame A at the front. Over the inner end of the pole 30 a bracket 31 is secured on the main frame, in which the inner or rear end of an arm 32 is pivoted, the outer end of the arm 32 being pivotally attached to and made to carry a doubletree B. A lug 33 is projected from each side of the arm 32, and at each of these lugs one end of a cord, rope, or chain 34 is secured. These cords, ropes, or chains lead one along each side of the frame, being carried over guide-rollers 35, as shown in Fig. 2, and at the rear end of the machine both cords, ropes, or chains 34 are secured to a lever 36, suitably fulcrumed on the rear extending portion of the frame.

If the planter is to be used for simultaneously planting two rows of potatoes, the lever 36 is moved so as to bring the arm 32, carrying the doubletree, over the tongue or pole, centering the doubletree thereon. If the right-hand planting device only is to be brought into operation, the lever 36 will be carried to the left, which will incline the arm 32 to the right and bring the major portion of the doubletree also to the right, as shown in Fig. 2, thus preventing side draft by having the preponderance of power at the right-hand side of the pole or tongue. If the left-hand planting attachment only is to be used, the lever 36 will be carried to the right and the doubletree moved in direction of the left-hand side of the tongue or pole, being the reverse of the arrangement illustrated in said Fig. 2.

At the top of the standards 26 28 a ring 37 or other form of holder is provided for the upper portion of a hopper 38, preferably funnel-shaped and open at its bottom. A rod 39 extends across the top of the hopper, and a shaft 40 has its upper end journaled in the rod, the lower end of the shaft being journaled in the strap connecting-bar 29 on the main frame. A beveled gear 41 is secured to the lower portion of the shaft 40 and meshes with the gear 16 on the drive-shaft 15. An undulating circular track 42 is located around the upright shaft 40, below the gear 41, being supported from the main frame by suitable standards 43.

The seed-potatoes are placed in the hopper 38 and fall from said hopper into the receiver C. This receiver extends around the lower end of the hopper and is attached to the upright shaft 40, revolving therewith. The main bottom 44 of the receiver is inclined from the center downward to the sides, as shown in Fig. 3, but a second or auxiliary bottom 45 is also provided, which practically connects with the inclined bottom 44. The receiver C is provided at intervals with extensions 46 from its upper edge. Usually four of such extensions are employed, and in the lower portion of the inclined bottom 44, opposite each of the extensions 46, a trough 47 is formed, (shown in detail in Fig. 8,) having an opening 48 in its bottom. Preferably in each of said openings 48 two agitating-arms 49 are located, being pivoted at their inner ends at the inner end portions of the openings 48 in the troughs 47, said openings being substantially V-shaped and widest at their upper portions. The outer ends of the agitating-arms 49 are free to move upward through openings made in a plate 50, secured to the side of the receiver C, as is also shown in Fig. 8, and the outer ends of the agitating-arms are connected and carry a roller 51, the said rollers being held to travel on the undulating track 42. The agitating-arms are practically in the form of plates vertically disposed, and as the receiver revolves these agitating arms or plates will be given a vertical reciprocating movement sufficient to shake the dust or extraneous matter from the seed-potatoes as they fall into said troughs.

Each extension 46 of the receiver has a central vertical slot 52 made therein, which is carried down into the main side portion of the receiver within a slight distance of the inclined bottom, and each extension 46 is further provided with an outwardly-extending horizontal flange 53, while at the bottom of each slot 52 a second flange 54 is formed similar to the upper one, 53. A rod 55 extends from the upper flange to the lower flange at each extended portion of the receiver. A stripper 56 in the nature of an angular plate is secured to each extension. These plates are attached directly to the upper flanges 53 and are carried downward along the inner face of the extensions 46 and horizontally inward, the vertical and lower horizontal portions of each plate being slotted to form tines, as illustrated in Fig. 2.

An arm 58 is held to slide upon each bar 55 back of the slots in the extensions of the receiver. These arms extend through the said slots 52 in the receiver, as illustrated in Fig. 3, and are provided with downwardly-extending tines 59, adapted to pass between the tines on the stripper-plates 56. In fact, the arms 58 are hollow and open at top and bottom, so that the central tines of the stripper plates or arms will pass through the arms 58. The tines of the arms 58 are adapted to pick up the seed-potatoes from the bottom portion of the receiver, and may therefore be termed "picker-arms."

Each picker-arm is provided at its outer end with a roller 60, and these rollers are adapted to travel on tracks 61. These tracks are two in number, are oppositely located, and are inclined, the lower end of one track being immediately below the higher end of the other track, so that when the rollers 60 reach and pass the highest portions of the tracks the picker-arms will drop downward to the bottom portion of the slots through which they extend and will then be in position to take up a seed-potato.

At opposite sides of the hopper 38, facing the sides of the main frame, inclined platforms 62 are located, the said platforms being given a downward inclination, and the platforms are usually two in number, being mounted to slide on frames or supports 63, which are secured to the hopper. A cord 64 is attached to each of these platforms, and these cords are carried rearward over pulleys 65, pendent from the upper support for the hopper, as shown in Fig. 1, and from said pulleys the cords are carried each to an engagement with a lever 66. These levers are fulcrumed at the rear portion of the main frame, one at each side of the center, and are held in adjusted position by engagement with racks 67 on the rear end of the frame 10.

It may here be remarked that the central lever 36, which controls the movement of the doubletree, is held in its adjusted position by engagement with a horizontal rack 67ª at the rear of the machine. (Shown in Fig. 2.)

Each lever 66 is provided with a crank-arm 68, and each crank-arm is attached to a stirrup 69, each stirrup being pivotally attached to a beam 70. These beams, two in number, are pivoted at their rear ends to the rear portions of the frame, as shown in Figs. 1, 2, and 3, and each beam carries at its forward end a runner or furrow-opener 71. Each runner has an opening 72 made in the top and communicating with a channel which is in the rear of the runner. Above the opening 72 in each runner a small hopper 73 is secured to the main frame, as particularly shown in Fig. 3, the seed being delivered from the platform 62 into the smaller hoppers or chutes 73, from which the seed falls through the openings in said runners and from thence enters the furrow.

At the back of each shoe or runner a post 74 is projected downward from the beam 70, connected with the shoe or runner, terminating at its lower end in a cross-bar 75, and at each end of this cross-bar a bolt is entered. Upon each bolt a disk 76 is mounted to turn, the disks being cupped or concaved upon their inner faces. The disks, as shown in Figs. 3 and 7, are at angles to one another, converging at their rear and diverging at the forward ends. The disks, following the runners, act to cover up the seed planted.

In operation one of the levers 66 having been carried downward and engaged with its rack 67, the platform 62, connected with that lever, will be raised, and likewise the shoe or runner and covering device connected with that lever, as shown at the right in Fig. 3. The seed having been placed in the hopper, as said machine is drawn forward the seed will drop into the bottom of the revolving receiver C. The seed, falling upon the cleaning or agitating arms 49, will be freed from dirt, and whenever a picker-arm 58 drops from the higher portion of a track 61 it will take up one or more seeds, and its roller 60 will commence the ascent of the next track. As the picker-arm carrying the seed approaches the elevated platform 62 the tines of the picker-arm will be carried up between the tines of the stripping plate or arm belonging to the extension carrying the picker-arm, and when the picker-arm is over the platform the tines of the stripping plate or arm will have freed the seed from the tines of the picker-arm, and the seed will simply return again to the bottom of the seed receiver or receptacle and be again taken up by the picker-arm the moment it is dropped from the track which carried it upward. Thus the seed will not be planted at this side of the machine. In the event, however, of the platform being in its lower position the seed stripped from the picker-arm would be retained by the platform until the seed could be delivered into the chute 73. This picker-arm will now commence the ascent of the other track 61 and will in like manner, as has been described, deliver the seed it carries upon the opposite platform 62, which is in its lower position, and the seed will be retained until the movement of the receiver has brought an open space or a space between extensions in front of the platform, whereupon the seed will drop from the platform into the chute or hopper 73, provided for it, and through the opening of the runner to the ground. When both platforms are in their lower positions, both runners will be in the ground, and two rows may be simultaneously planted.

The elevation of the inclined tracks directly over the chutes will be such as to impart to a potato a sudden push, enabling it to more certainly drop. Any desired number of pickers may be used. Preferably eight are employed, and the greater the number of pickers used the more decided will be the inclination of the tracks, especially over the chutes.

The machine can be changed as to speed by using different-sized sprocket-wheels in connection with the driving-chains. When the speed of the receiver is changed, the dropping distance will be also altered.

Having thus described my invention, I claim as new and desire to secure by Letters Patent—

1. In a potato-planter, a revoluble seed-receiver, a stripping device carried by the receiver, a picking device also carried by the receiver, and means for moving one of said devices to or from the other as the receiver revolves.

2. In a potato-planter, a revoluble seed-receiver, a stripping device stationary on said receiver, a picking device adapted to take up seed from the receiver and mounted on the receiver for movement to and from the stripping device, and means, substantially as described, for carrying the picking device to the stripping device and subsequently releasing the picking device.

3. In a potato-planter, a revoluble seed-receiver, a stripping device secured to said receiver, a picking device mounted to slide on said receiver to and from the picking device, said picking device being provided with a projection, and inclined tracks independent of the receiver, said tracks being in engagement with the projections from the picking device.

4. In a potato-planter, the combination, with a revoluble seed-receiver, a stripping device secured to said receiver, and a picking device mounted to slide on the receiver to and from the stripping device, said picking device being provided with a lateral projection, of spiral tracks arranged one at each side of the receiver, independent thereof, the lower end of one track being beneath the higher end of the opposing track, the tracks being engaged by the projection from the picking device.

5. In a potato-planter, a revoluble seed-receiver, a picker and a stripping device for the picker, carried by said receiver, the receiver being provided adjacent to the path of each picker with an opening in its bottom, a cleaning device located in each of said openings, and means, substantially as described, for imparting vertical movement to the said cleaning devices as the receiver is revolved.

6. In a potato-planter, the combination, with a revoluble seed-receiver, a stationary stripping device carried thereby, a picking device having movement to and from the stripping device, and means for operating the said picking device, of cleaning-blades located in the bottom of the receiver adjacent to that portion at which the picking device has movement, the said cleaning-blades being capable of vertical movement within the receiver, an undulating stationary track, and rollers carried by the cleaning-blades, arranged to travel on said track.

7. In a potato-planter, the combination, with a rotatable seed-receiver, and picking and stripping devices carried by said receiver, of platforms independent of and located within the said seed-receiver, said platforms being arranged to receive the seed when stripped from the picker.

8. In a potato-planter, the combination, with a seed receiver or receptacle provided with stationary strippers and picking devices movable to and from the said strippers, of platforms located within yet independent of the said seed-receiving receptacle, being adapted to receive the seed when dropped from the pickers, and means, substantially as described, for adjusting the position of the platforms relative to the pickers.

9. In a potato-planter, the combination, with a hopper, a seed-receiving receptacle mounted to revolve around said hopper, stationary strippers carried by said receptacle, pickers also carried by the receptacle, having movement to and from the strippers, and means, for operating said pickers, the seed-receptacle being provided with openings between the sections at which the strippers and pickers are located, of platforms adjustably supported from the hopper, and levers for adjusting said platforms.

10. In a potato-planter, the combination, with a hopper, a seed-receiving receptacle mounted to revolve around said hopper, stationary strippers carried by said receptacle, pickers also carried by the receptacle, having movement to and from the strippers, and means, for operating said pickers, the seed-receptacle being provided with openings between the sections at which the strippers and pickers are located, of platforms adjustably supported from the hopper, levers connected one with each platform, cleaning-blades having vertical movement in the bottom of the seed-receptacle, an undulating track upon which the said blades travel, for the purpose specified.

11. In a potato-planter, the combination, with a chute adapted to receive the seed-potatoes, and a runner pivotally connected with the frame of the machine, the said runner being provided with an opening registering with the outlet of said chute, of a covering device located at the rear of the opening in the runner, the covering device consisting of a post and cupped disks having their concaved faces opposite each other, the disks being pivoted to the said post at an angle one to the other so that their rear ends converge and their forward ends diverge.

12. The combination, with the pole of a wheeled vehicle, of an arm pivoted over said pole, a draft device pivoted to the free end of the said arm, and levers having a shifting connection with the said arm.

13. In a planter or like machine adapted to plant seed or deliver material from opposite sides, an arm pivoted over the tongue or pole of the vehicle, a draft device pivoted to the free end of the said arm, a shifting lever, and a flexible connection between said lever and said arm, whereby the arm may be held over the tongue, or at the right or the left of the tongue to control the draft of the machine.

14. In a potato-planter, the combination with a revoluble receiver having openings in its bottom, of cleaning-blades pivoted in said openings, rollers secured to the under face of the free ends of the blades, and an undulating track below the receiver and upon which the said rollers travel, substantially as described.

15. In a potato-planter, the combination with a revoluble receiver, a stripper secured to the receiver and provided with tines, a picker mounted on the receiver to slide vertically and provided with downwardly-projecting tines, spiral tracks one at each side of the receiver, and a roller carried by the picker and traveling on said tracks, substantially as described.

16. In a potato-planter, the combination with a hopper, a revoluble receiver below the hopper, a chute adjacent to the receiver, and a picker and stripping device carried by the receiver, of an inclined platform adjustably secured to the hopper, substantially as and for the purpose set forth.

JOHN ALEXANDER COOPER.

Witnesses:
R. D. McEvoy,
J. E. Rhodes.